United States Patent
Sun et al.

(10) Patent No.: US 12,388,093 B2
(45) Date of Patent: Aug. 12, 2025

(54) METHOD FOR CONSTRUCTING STARCH FUEL CELL WITH ANODE

(71) Applicant: DALIAN UNIVERSITY, Dalian (CN)

(72) Inventors: Jing Sun, Dalian (CN); Houyong Cao, Dalian (CN); Mingfei Lang, Dalian (CN)

(73) Assignee: DALIAN UNIVERSITY, Dalian (CN)

( * ) Notice: Subject to any disclaimer, the term of this patent is extended or adjusted under 35 U.S.C. 154(b) by 645 days.

(21) Appl. No.: 17/754,631

(22) PCT Filed: Aug. 25, 2020

(86) PCT No.: PCT/CN2020/111061
§ 371 (c)(1),
(2) Date: Apr. 7, 2022

(87) PCT Pub. No.: WO2021/128898
PCT Pub. Date: Jul. 1, 2021

(65) Prior Publication Data
US 2022/0393186 A1    Dec. 8, 2022

(30) Foreign Application Priority Data
Dec. 25, 2019   (CN) .......................... 201911355749.7

(51) Int. Cl.
*H01M 4/92* (2006.01)
*H01M 4/88* (2006.01)
(52) U.S. Cl.
CPC ......... *H01M 4/921* (2013.01); *H01M 4/8853* (2013.01); *H01M 4/925* (2013.01)
(58) Field of Classification Search
None
See application file for complete search history.

(56) References Cited

U.S. PATENT DOCUMENTS

| 7,632,779 B1* | 12/2009 | Ding ........................ C22C 5/02 |
| | | 428/673 |
| 10,612,152 B2* | 4/2020 | Xu ............................ C25F 3/02 |

FOREIGN PATENT DOCUMENTS

| CN | 101642714 A | 2/2010 |
| CN | 109298053 A | 2/2019 |

OTHER PUBLICATIONS

International Search Report and Written Opinion issued in corresponding International Application No. PCT/CN2020/111061, mailed Oct. 28, 2020; 9 pgs.

* cited by examiner

Primary Examiner — Tracy M Dove
(74) Attorney, Agent, or Firm — HAUPTMAN HAM, LLP

(57) ABSTRACT

A method for constructing a starch fuel cell with an anode belongs to the field of fuel cells. The method includes using a PdNFs/FeNPs/MFC electrode as a working electrode, an Ag/AgCl electrode as a reference electrode, and a platinum wire as an auxiliary electrode to form a three-electrode system. The method includes placing the three-electrode system in a starch solution and a supporting electrolyte; setting the potential as −0.2 to 1.3V. The method includes recording the cyclic voltammetry curves of the starch with concentrations of 1 mmol/L, 3 mmol/L, 5 mmol/L, 7 mmol/L, and 10 mmol/L. The method includes analyzing the control process of the electrode electrocatalytic oxidization of the starch solution by the standard curve method. The present fuel cell can be used to manufacture portable power banks, and can be used in power plants, electric vehicles and other fields.

3 Claims, 3 Drawing Sheets

//+1
METHOD FOR CONSTRUCTING STARCH FUEL CELL WITH ANODE

RELATED APPLICATIONS

The present application is a U.S. National Phase of International Application Number PCT/CN2020/111061 filed Aug. 25, 2020 and claims priority to Chinese Application Number 201911355749.7 filed Dec. 25, 2019.

TECHNICAL FIELD

The present disclosure belongs to the field of fuel cells, and specifically relates to a method for constructing a starch fuel cell with an anode.

BACKGROUND

A sugar fuel cell, which is a battery developed by a research team at Virginia Tech University in the United States, uses sugar as the energy source to provide electricity, and has an energy density reaching an unprecedented level. If further developed, it is expected to replace conventional batteries as a cheap, rechargeable, and biodegradable battery. The related paper was published in the journal *Nature Communications* on Jan. 21, 2014. Sugar fuel cells utilize a series of enzymes mixed together in a way not found in nature. The researchers constructed a non-natural synthase pathway that captures all charge potentials from sugar to generate electricity in a tiny enzymatic fuel cell. They used low-cost biocatalyst enzymes as catalyst instead of expensive platinum, which is typically used in conventional batteries. All electron charges stored in the sugar solution were released slowly and step-by-step by using an enzyme infusion.

However, enzymes have insufficient tolerance to survive in highly acidic or alkaline environments, and cannot provide stable electricity, thus limiting their application in fuel cells.

SUMMARY

In view of the above deficiencies, the present disclosure provides a method for constructing a starch fuel cell with an anode, and the fuel cell constructed by the method can provide stable electricity at a low cost.

In order to solve the aimed technical problems, the present disclosure constructs a fuel cell by the following method: using a PdNFs/FeNPs/MFC electrode as a working electrode, an Ag/AgCl electrode as a reference electrode, and a platinum wire as an auxiliary electrode to form a three-electrode system; placing the three-electrode system in a starch solution and a supporting electrolyte; setting the potential as from −0.2 to 1.3V; recording the cyclic voltammetry curves with the starch concentrations of 1 mmol/L, 3 mmol/L, 5 mmol/L, 7 mmol/L, and 10 mmol/L; and analyzing the control process of the electrode electrocatalytic oxidization of the starch solution by the standard curve method.

Furthermore, the supporting electrolyte is a 1 mol/L KOH aqueous solution with a pH of 14.

Furthermore, the PdNFs/FeNPs/MFC electrode comprises: a mesoporous nickel foam as a substrate and a conductive layer, and iron-palladium particles as an electrochemical deposition layer, wherein the nano-palladium-iron particles are deposited on the mesoporous nickel foam.

Principle: The PdNFs/FeNPs/MFC electrode has a mesoporous nickel foam as the substrate; the MFC has a uniform and porous pore size, a huge specific surface area and a three-dimensional pore structure, and has good conductivity. Nano-iron particles are deposited on the MFC, and nano-palladium is electrodeposited on the nano-iron. Carbon black has a huge specific surface area, so a large number of nano-iron particles can be deposited thereon. As a result, the area where the nano-palladium is attached to the nano-iron is enlarged, the contact area of the nano-palladium to the starch is enlarged, and the electric current is increased, thereby achieving the purpose of increasing the output power of the cell.

The PdNFs/FeNPs/MFC electrode has high sensitivity, excellent catalytic effect, and good selectivity for starch.

Advantageous effects: the present disclosure utilizes the good conductivity of a mesoporous nickel foam to prepare an electrode with high sensitivity to starch, and the electrode has the advantages of a good catalytic effect, high sensitivity, good selectivity, a stable structure and the like when starch is used as a base liquid; the present fuel cell can be used to manufacture portable power banks, and can be used in power plants, electric vehicles and other fields.

DETAILED DESCRIPTION

The technical solutions of the present disclosure will be further described below with reference to the drawings and specific Examples, but the present disclosure is not limited to the details of the Examples in any form. Unless otherwise specified, the experiment methods described in the Examples are all conventional methods; and unless otherwise specified, the experiment reagents and materials are all commercially available.

The preparation method of the PdNFs/FeNPs/MFC electrode in the following Examples is as follows:

A piece of mesoporous nickel foam to be used was taken and cut out a mesoporous nickel foam with a size of 10*20 mm for later use. The mesoporous nickel foam was rinsed with deionized water and dried.

The electrode was prepared through the following specific steps.

(1) A three-electrode system was used, wherein the cleaned mesoporous nickel foam electrode was used as the working electrode, and an Ag/AgCl electrode and a platinum wire electrode were respectively used as the reference electrode and the counter electrode; and the three-electrode system was placed in an electrolytic cell containing a ferrous sulfate solution (0.02 mol/L ferrous sulfate+0.1 mol/L sodium sulfate+0.1 mol/L ascorbic acid). Chronoamperometry was used, and the electrodeposition parameters of the electrochemical workstation were set as follows: the voltage −1.2V, and time 300 s.

(2) A three-electrode system was used, the three-electrode system was placed in a mixture for 5 min by immersing the nano-structured Fe/mesoporous nickel foam glass in the mixture, wherein the mixture contains acetic acid-sodium acetate with a pH of 4 as a buffer solution and a $PdCl_2$ solution with a concentration of 5 mmol/L; 5 min later, the system was taken out, washed with ultra-pure water, dried with nitrogen, and placing for two days for later use.

Figure 1:
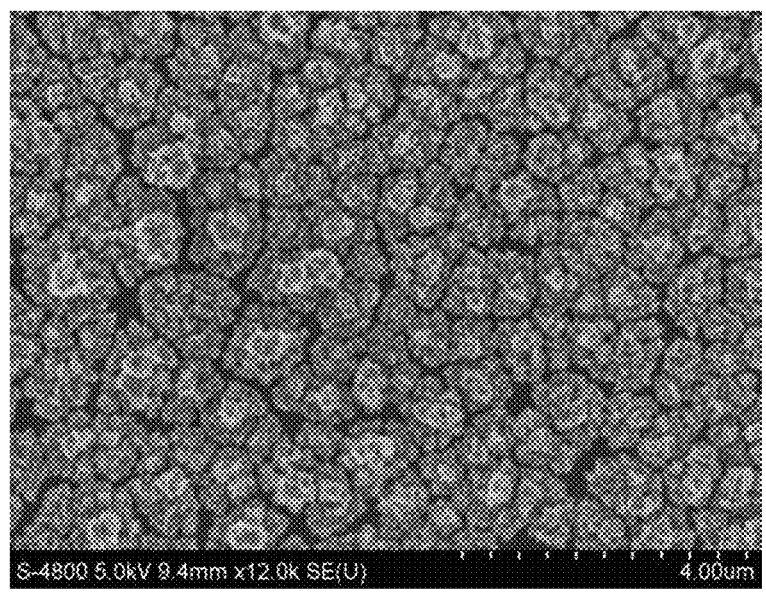
FIG. 1 shows the surface topography of nano-palladium-iron composite electrode based on the mesoporous nickel foam.

The surface topography of the mesoporous nickel foam-based nano-palladium-iron composite electrode is shown in FIG. 1: the particle size and distribution of the nano-particles on the electrode are uniform, so the electrocatalytic properties are particularly outstanding.

Figure 2:
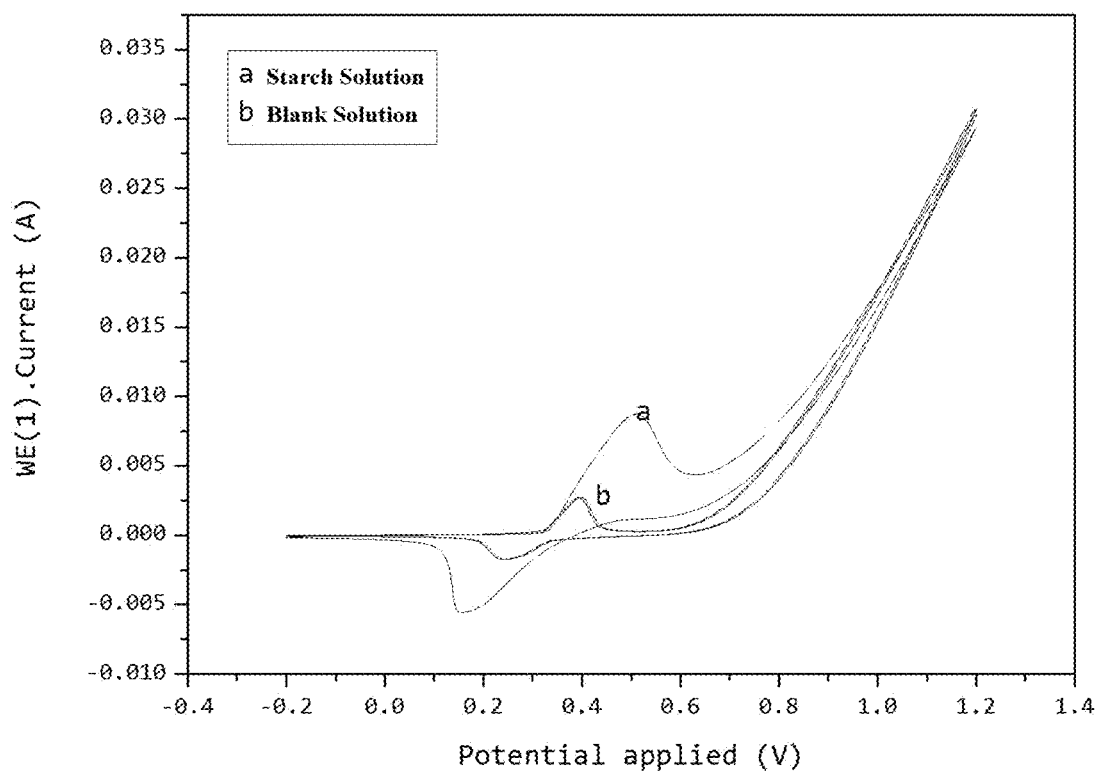
FIG. 2 shows the comparison chart of cyclic voltammetry curves between a starch solution and a blank solution.

Example 1 Comparison of Cyclic Voltammetry Curves Between Starch Solution and Blank Solution Firstly, the three-electrode system was placed in a KOH solution with a pH of 14 and a concentration of 1 mol/L; cyclic voltammetry was used to scan in the potential range of −0.2 to 1.3V; and the cyclic voltammetry curve of the blank solution was recorded. Then, the three-electrode system was placed in a 10 mmol/L starch solution to be tested, which contains 1 mol/L KOH solution with a pH of 14 as a supporting electrolyte; cyclic voltammetry was used to scan in the potential range of −0.2 to 1.3V; and a cyclic voltammetry curve of the starch was recorded. As shown in FIG. 2, the catalytic effect of the PdNFs/FeNPs/MFC electrode in 10 mmol/L starch solution was tested at a scan speed of 100 mV/s. It can be seen from the Figure, the PdNFs/FeNPs/MFC electrode has the catalytic current of 1,000,000 $\mu A/cm^2$/mol for starch. It is indicated that the fuel cell comprising the PdNFs/FeNPs/MFC electrode could convert bioenergy into electrical energy with high efficiency.

Figure 3:
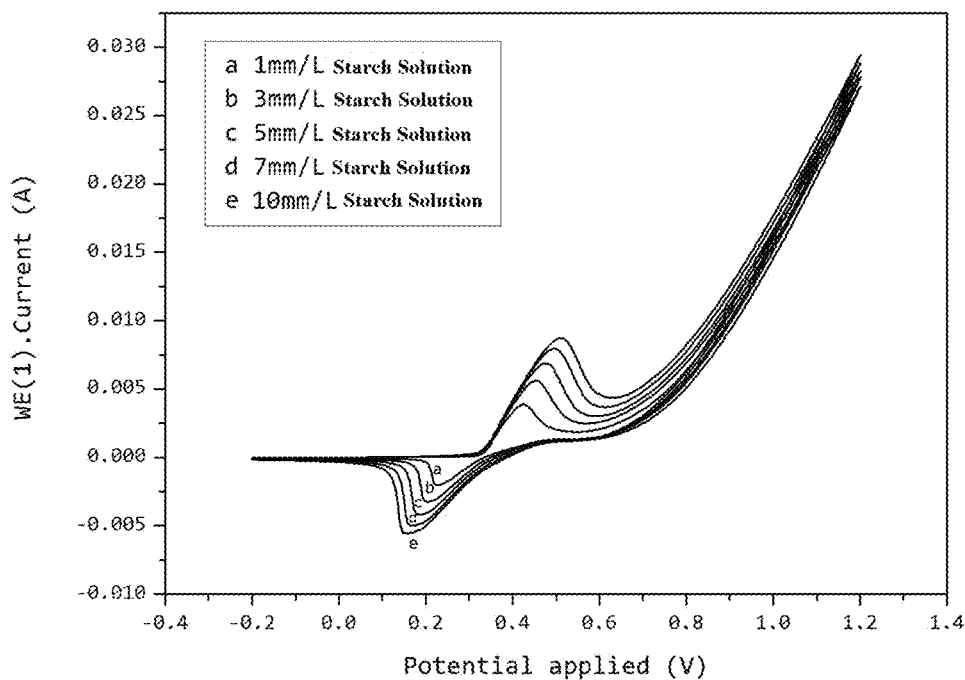
FIG. 3 shows the cyclic voltammetry curves of starch solutions with different concentrations.
Figure 4:
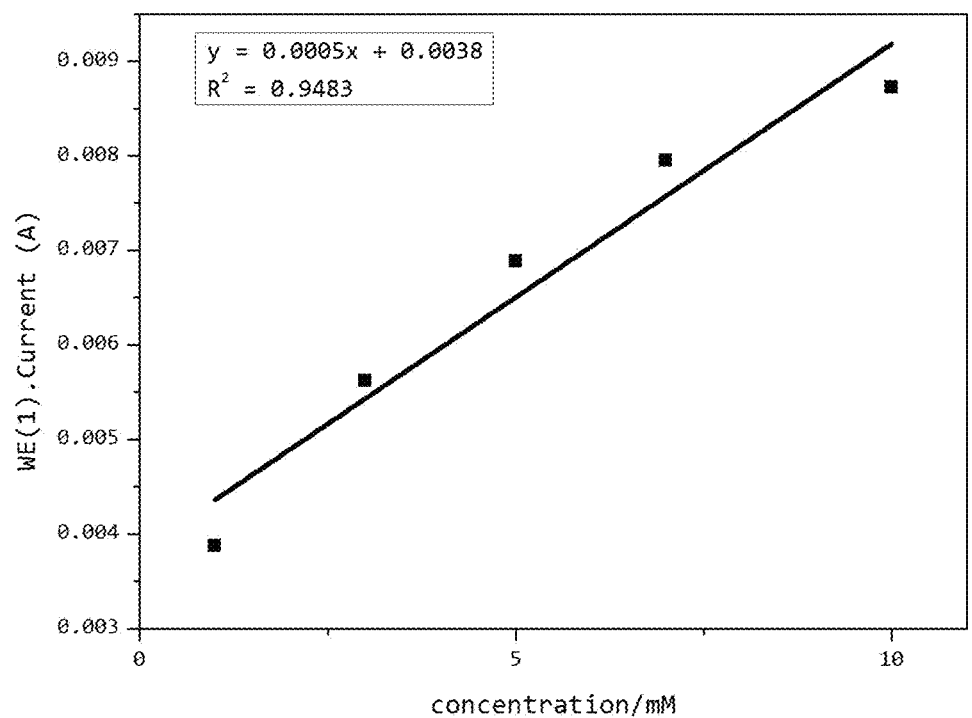
FIG. 4 shows a standard curve of starch with different concentrations.

Example 2 Cyclic Voltammetric Responses of PdNFs/FeNPs/MFC Electrode to Starch Solutions with Different Concentrations The three-electrode system was placed successively in starch solutions to be tested with different concentrations, which contains 1 mol/L KOH solution with pH of 14 as a supporting electrolyte; and 1 mmol/L, 3 mmol/L, 5 mmol/L, 7 mmol/L and 10 mmol/L starch solutions were tested at a scan speed of 50 mV/S by using cyclic voltammetry in a potential range of −0.2 to 1.3V. The cyclic voltammetry curves for starch solutions with different concentrations at the same scan speed were recorded. As can be seen from FIG. 3 and FIG. 4: along with the increase of concentration, the oxidation currents of the nano-electrode in the starch solutions continuously increased, and the oxidation peaks also continuously rose, which shows a good linear response regarding the catalysis of starch reaction. The redox reaction of starch was controlled by diffusion. There was also a good linear relationship between the two in the range of 1 to 10 mmol/L. The linear regression equation between the oxidation peak current and the concentration of starch is I=0.0005 C+0.0038, wherein the correlation coefficient is 0.9483.

Example 3 Determination of Anti-Poisoning Ability of Electrode

Figure 5:
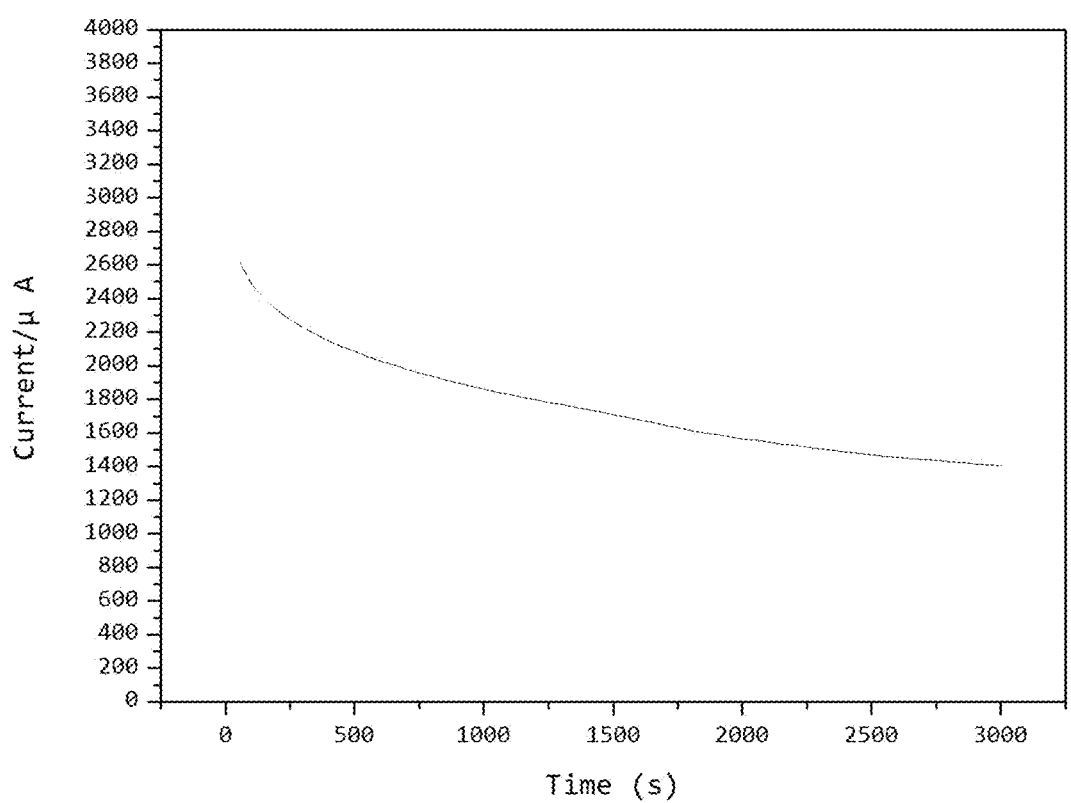
FIG. 5 shows an anti-poisoning curve of the PdNFs/FeNPs/MFC electrode.

Firstly, the three-electrode system was placed in a 10 mm starch solution to be tested, which contains 1 mol/L KOH solution with a pH of 14 as a supporting electrolyte; and the time-current curve of the starch was recorded at a potential of 0.65V using time-chronoamperometry method. However, as shown in FIG. 5, the current density dropped sharply at the beginning. At the beginning of the reaction, it is a fast kinetic reaction, so the active sites do not contain adsorbed starch molecules. After that, the adsorption of new starch molecules depended on the release of electrocatalytic sites through starch oxidation, or the formation of intermediate species such as CO, CHx, etc. in the first few minutes (rate-determining step), and the electrode catalytically active sites are occupied. Therefore, the slight decrease in current density was mainly due to the poisoning of the catalyst. In addition, throughout the test period, the specific current experienced a rapid drop in the first 300 seconds, and remained a smooth and gentle change with a decay of about 20% after the end of the test. Therefore, the electrode had strong anti-poisoning ability and stable structure.

The description above merely provides some preferred embodiments of the present disclosure, but does not limit the protection scope pursued by the present disclosure. Those skilled in the art may make equivalent replacements or modifications based on the technical solutions and the spirit thereof in the present disclosure, without departing from the technical scope disclosed herein. All such equivalent replacements and modifications are intended to be within the protection scope pursued by the present disclosure.

The invention claimed is:

1. A method for constructing a starch fuel cell with an anode, comprising:
    using a working electrode, a reference electrode, and a counter electrode to form a three-electrode system, wherein the working electrode is a PdNFs/FeNPs/MFC electrode and PdNFs/FeNPs/MFC acts as the anode, the reference electrode is an Ag/AgCl electrode, and the counter electrode is a platinum wire;
    placing the three-electrode system in a starch solution and a supporting electrolyte; setting a potential as from −0.2 to 1.3V;
    recording cyclic voltammetry curves with starch concentrations of 1 mmol/L, 3 mmol/L, 5 mmol/L, 7 mmol/L, and 10 mmol/L; and
    analyzing a control process of an electrode electrocatalytic oxidization of the starch solution by a standard curve method.

2. The method for constructing the starch fuel cell with the anode according to claim 1, wherein the supporting electrolyte is a 1 mol/L KOH aqueous solution with a pH of 14.

3. The method for constructing the starch fuel cell with the anode according to claim 1, wherein the PdNFs/FeNPs/MFC electrode is prepared by following steps:
    (1) using a three-electrode system I, wherein a cleaned mesoporous nickel foam electrode is used as a working electrode of the three-electrode system I, and an Ag/AgCl electrode and a platinum wire electrode are used as a reference electrode and a counter electrode of the three-electrode system I, respectively; placing the three-electrode system I in an electrolytic cell comprising 0.02 mol/L ferrous sulfate, 0.1 mol/L sodium sulfate, and 0.1 mol/L ascorbic acid; using chronoamperometry, and setting electrodeposition parameters of a electrochemical workstation as follows: a voltage of −1.2V, and time of 300 s;
    (2) using a three-electrode system II, wherein a working electrode of the three-electrode system II is a nano-structured Fe/mesoporous nickel foam glass, and an Ag/AgCl electrode and a platinum wire electrode are used as a reference electrode and a counter electrode of the three-electrode system II, respectively; placing the three-electrode system II in a mixture for 5 min by immersing the nano-structured Fe/mesoporous nickel foam glass, wherein the mixture comprises acetic acid-sodium acetate with a pH of 4 as a buffer solution and a $PdCl_2$ solution with a concentration of 5 mmol/L; 5 min later, taking out, washing with ultra-pure water, drying with nitrogen, and storing for two days for later use.

* * * * *